United States Patent [19]
Clarke et al.

[11] Patent Number: 5,245,869
[45] Date of Patent: Sep. 21, 1993

[54] HIGH ACCURACY MASS SENSOR FOR MONITORING FLUID QUANTITY IN STORAGE TANKS

[75] Inventors: Richard H. Clarke, Scituate; Wai Chung, Watertown; Stephen DeJesus, Newton; Harvey Harrison, Needham; T. Eric Hopkins, Wellesley, all of Mass.

[73] Assignee: Boston Advanced Technologies, Inc., Newton, Mass.

[21] Appl. No.: 769,865

[22] Filed: Oct. 1, 1991

[51] Int. Cl.⁵ .................. G01F 22/02; G01F 23/18; G01M 3/32; G01L 7/06
[52] U.S. Cl. .................. 73/149; 73/49.2; 73/301; 73/1 H; 73/292; 364/509
[58] Field of Search ............... 73/149, 49.2 T, 708, 73/714, 865, 11T/1R, 4 R, 729, 291, 292, 301; 374/143, 54; 364/509, 510, 571.01, 571.08

[56] References Cited

U.S. PATENT DOCUMENTS

| | | | |
|---|---|---|---|
| 1,909,545 | 5/1933 | Knobloch | 73/301 X |
| 2,373,292 | 4/1945 | Clason | 73/301 |
| 2,593,473 | 4/1952 | McKnight, Jr. | 73/301 U X |
| 2,637,999 | 5/1953 | Klebba | 73/301 |
| 2,773,385 | 12/1956 | Johnson | 73/301 |
| 2,791,906 | 5/1957 | Vetter | 73/291 |
| 2,844,034 | 7/1958 | Statham | 73/729 X |
| 3,068,700 | 12/1962 | Bourns | 73/729 X |
| 3,447,379 | 6/1969 | Peters | 73/301 X |
| 3,498,130 | 3/1970 | Brown | 73/301 |
| 3,653,264 | 4/1972 | Mills | 73/49.2 X |
| 4,227,410 | 10/1980 | Ruben et al. | 73/729 X |
| 4,480,479 | 11/1984 | Enatsu | 73/729 |
| 4,627,281 | 12/1986 | Tavis | 73/301 X |
| 4,646,560 | 3/1987 | Maresca, Jr. et al. | 73/49.2 T |
| 5,131,264 | 7/1992 | Jensen | 73/49.2 T |

FOREIGN PATENT DOCUMENTS

| | | | |
|---|---|---|---|
| 2822593 | 10/1979 | Fed. Rep. of Germany | 73/291 |
| 829790 | 7/1938 | France | 73/149 |
| 144617 | 7/1985 | Japan . | |
| 144618 | 7/1985 | Japan . | |

Primary Examiner—Tom Noland
Attorney, Agent, or Firm—Thomas J. Engellenner

[57] ABSTRACT

A mass sensing system for monitoring the amount of fluid in a storage tank with an accuracy high enough to determine both the quantity present and the potential loss of fluid at a loss rate of 0.05 gal/hr or at least 0.1 gal/hr. The system utilizes a pressure sensor positioned at the bottom of the tank and in contact with the fluid. This device includes a bellows unit whose displacement is correlated to changes in the mass of fluid in which it is immersed, and a transducer for monitoring the position of the bellows, wherein the interior of the bellows unit is in the same atmosphere as the sensor, and the sensor is in communication with the vapor pressure immediately above the fluid in the tank. The outside of the bellows is subjected to the stored fluid. A multiple-capsule bellows assembly is coupled to an LDVT transducer in a thermal-expansion-cancelling configuration of the invention.

16 Claims, 4 Drawing Sheets

HIGH ACCURACY MASS SENSOR FOR MONITORING FLUID QUANTITY IN STORAGE TANKS

The present invention relates to method and apparatus for monitoring fluid quantity in storage tanks.

Inventory control and leak monitoring of stored fluids which may be highly flammable, corrosive, or reactive, requires an accurate sensor that can withstand this environment and yet can provide exceptional stability with high sensitivity. As well, based on present EPA standards, there presently exists a need for an accurate sensor that may be used in a storage tank containing hydrocarbon fluids (gasoline, diesel fuels, aviation fuels, etc.) capable of monitoring both the quantity of such fluid present in the tank for inventory control (to an accuracy of $\frac{1}{8}'$ or better) and the loss of such fluid over time for leak detection (for rates as low as 0.05 or at least 0.1 gal/hour).

Conventionally, the quantity of hydrocarbon fluid in a storage tank is reported as either a gross volume at ambient temperature or as normalized to a net volume at 60° F., and presently there is a need for a cost-effective sensor system which can accurately provide such gross and net data in such environment, and at a resolution which enables loss detection at 0.1 gal/hour. However, the significant thermal expansion coefficient of hydrocarbon fluids requires that sensing methods insensitive to temperature-induced volume changes be used to successfully detect the loss of such fluids with a low probability of false leak detection. Conventional systems employ various level sensing and volumetric methods, and attempt to correct errors caused by thermal expansion of the fluid by monitoring temperature throughout the tank.

It is, therefore, an object of the Present invention to provide a high resolution and highly accurate sensor and system for monitoring the amount of hydrocarbon fluid in a storage tank.

SUMMARY OF THE INVENTION

The present application describes a system for monitoring the amount of fluid in a storage tank with an accuracy high enough to determine both the quantity present and the potential loss of fluid at a loss rate of 0.05 gal/h or at least 0.1 gal/hr. The system utilizes a detection device positioned at the bottom of the tank and in contact with the fluid. This device includes a bellows unit whose displacement is correlated to changes in the mass of fluid in which it is immersed, and a transducer for monitoring the position of the bellows. The transducer output provides a relatively low resolution measurement of fluid quantity for inventory control purposes, while this same output also can be optimized for highly accurate leak detection.

The system determines the quantity of fluid in the tank by measuring the mass of fluid above a pressure sensor. In a preferred embodiment, the sensor includes a multiple-capsule bellows unit which is quite sensitive and whose movement accurately reflects the mass load or changes therein of the fluid in the tank. An electro-mechanical transducer monitors the surface of the bellows unit while remaining out of contact with the fluid bulk, so as to eliminate fouling or interference from any reactivity or corrosivity of the fluids.

Since the device is mass-sensitive (i.e., measures the weight of the column), rather than level-sensing or volume-measuring, it is essentially immune to temperature effects (except for thermal expansion of the device itself) when measuring the contents of a vertically-walled tank. In particular, the present invention recognizes that measuring the height of a fluid directly is subject to error from thermal effects, and requires temperature compensation, while in a purely pressure measurement, thermal compensation is not required Hence for a storage tank with vertical walls perpendicular to the force of gravity (the conventional above-ground fuel storage tank), as temperature changes so does the column height while density changes inversely, and therefore mass and weight remains the same. Thus, sensing the pressure exerted by this unchanging mass at the bottom of such storage tank can produce reliable quantitative results, without the need for temperature compensation.

Therefore, in one embodiment of the invention, a pressure sensor is placed at the bottom of a vertically-walled storage tank to determine the mass of the stored fluid. Compensation for thermal expansion of the stored fluid is not required for gross measurement at ambient temperature, except for compensation for thermal effects upon the sensor itself. In addition, if accurate temperature data is available for the stored fluid, such gross data can be normalized to net quantity at 60° F. Furthermore, such temperature data can be processed to obtain loss rate for leak detection, and in a particular embodiment, can achieve resolution of better than 0.05 gal/hr.

In yet another embodiment, such temperature data is used to correct for the effects of having a non-vertically walled container, such as present in most underground storage tanks. Even so, in practice of the invention, less temperature correction is required and less expensive temperature sensors can be used compared to conventional devices obtaining the same accuracy.

In a preferred sensor of the invention, a linear variable differential transformer (LVDT) connected to a specially designed multiple-capsule bellows assembly detects differential pressure directly related to the measured column of fluid. The bellows unit is vented to the vapor pressure at the top of the fluid within the tank, which makes the system functional in both vented and unvented tanks, and virtually insensitive to atmospheric pressure influence.

In this embodiment, two separate temperature corrections are made. One is for fluid expansion, and the other is for the errors induced by temperature changes in the sensor device itself. The former is performed by disclosed signal processing techniques. The latter is performed by disclosed signal processing techniques based upon data obtained from the LVDT, and a temperature sensor adjacent to the LVDT for correction of thermal drift in that component, and by a disclosed selection, construction and combination of materials having low and self-compensating thermal expansion effects.

The system utilizes the equation:

$$P = \rho \times h + P_0,$$

where the column pressure P exerted on the exterior of the bellows unit is given as the density of the fluid $\rho$ multiplied by the height h of the column plus atmospheric pressure $P_0$ at the top of the column. However, in practice of the invention, $P_0$ is canceled by taking the surface pressure at the top of the fluid within the tank and presenting that to the interior of the bellows unit.

Thus the sensor system is independent of exogenous factors related to external static or atmospheric pressure, humidity, or the like, and the sensed column pressure P can be divided by the known density $\rho$ to obtain the height of the column (which is then converted to gallons).

BRIEF DESCRIPTION OF THE DRAWING

These and other features and advantages of the present invention will be more fully understood by reference to the following detailed description in conjunction with the attached drawing in which like reference numerals refer to like elements and in which.

DETAILED DESCRIPTION

Figure 1:
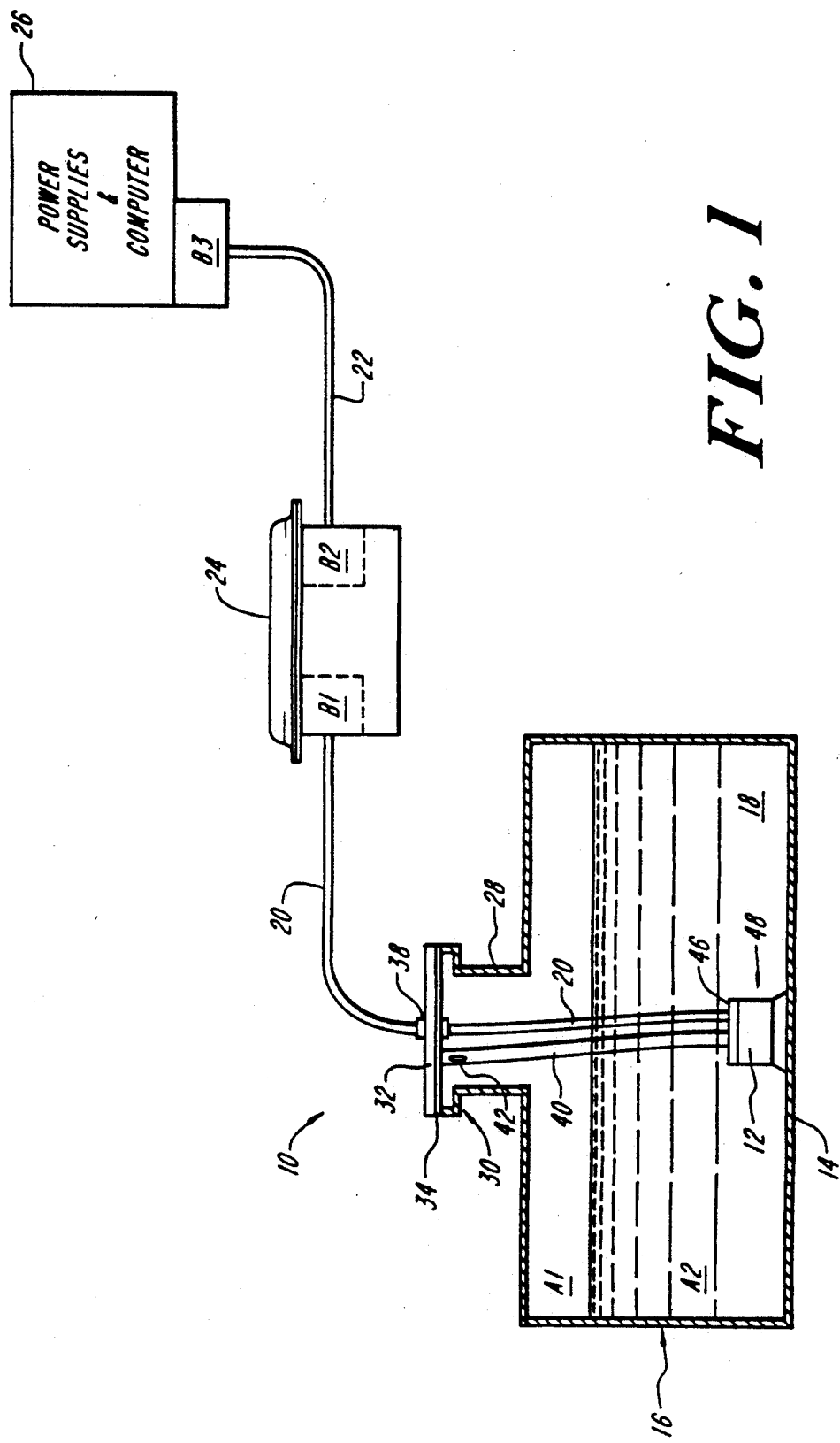
FIG. 1 is a schematic diagram of a sensor system according to the invention.

A mass sensor system 10 of the invention is shown in FIG. 1 including a sensor assembly 12 located at or near the bottom 14 of a closed storage tank 16 which contains hydrocarbon fluid 18. System 10 detects the mass, and changes in the mass, of fluid 18, as changes in pressure and correlates this pressure data to fluid quantity for inventory) and loss rate (for leak detection). Sensor assembly 12 generates a detection signal representative of the difference between the pressure of two atmospheres, i.e., of the fluid vapor (A1) and of the tank bottom (A2), enclosed within the tank. This signal is transmitted on cable 20 to an energizing, conditioning and processing electronics package 24. Package 24 is coupled via cable 22 to a power supply and displaying computer 26, and provides two sets of data to computer 26: fluid volume and change in fluid volume.

In this embodiment, vertically walled tank 16 extends up to a terminating neck 28 having a flanged opening 30 which is closed by means of cover plate 32 and is sealed thereat forming a vapor seal 34 between the flanged opening and cover plate. Cover plate 32 defines a passage 38 through which extends cable 20 to carry the detection signal from sensor assembly 12 within the sealed tank to the external electronics package 24. Cable 20 is safety sealed at its outer diameter where it passes through plate 32 by means of a potting compound, such as Scotchcast No. 4403 available from 3M Corporation. Cables 20 and 22 connect to electronics package 24 and computer 26 by means of electrical safety barriers B1, B2 and B3. Barriers B1 and B2 are also sealed with potting compound. As well, electronics package 24 is housed in an explosion proof box.

The exterior of a sensing section 46 at the base of sensor assembly 12 is in fluid communication with atmosphere A2 of the stored fluid 18. A vent tube 40 is mounted to the bottom of cover plate 32, and opens out thereat at vent 42 (or perhaps by means of a sealed pressure transfer membrane to prevent fluid entry into the tube) in communication with the fluid vapor atmosphere A1 in the tank. The interior of sensing section 46 and a transducer section 48 of sensor assembly 12 are coupled by vent tube 40 to, and pressurized according to, the fluid vapor atmosphere A1. Sensing section 46 senses the difference between the pressure of the two atmospheres A1, A2 within the tank and is mechanically displaced according to such difference. Transducer 48 senses such mechanical displacement and converts it to an electrical detection signal output representative thereof, which is then conditioned and processed by package 24 in a manner described later.

Figure 2:
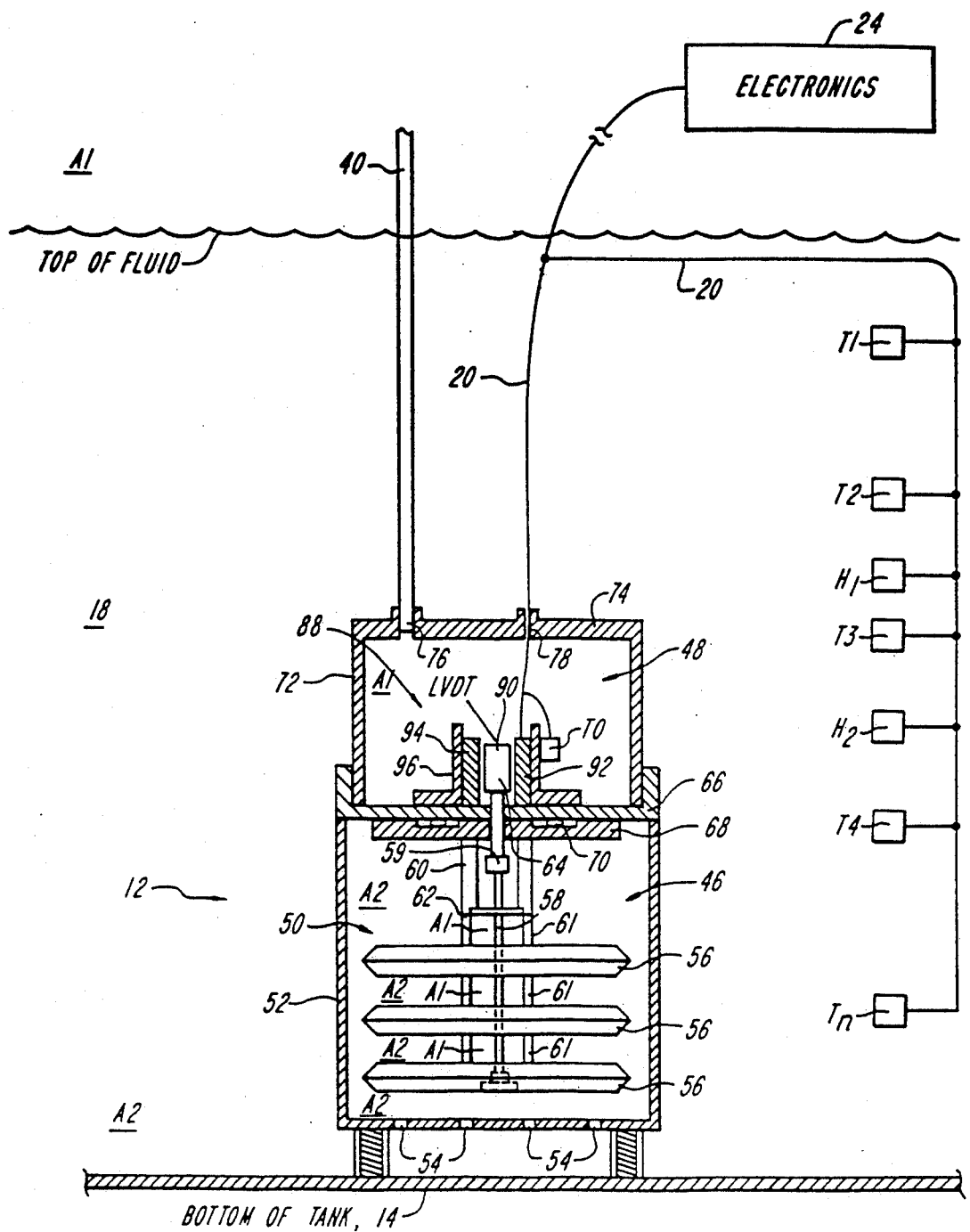
FIG. 2 is a side cross-sectional view of a sensor of the invention in a column of fluid.

Turning to FIG. 2, sensor 12 is shown located at the bottom 14 of a tank and immersed in the hydrocarbon fluid 18 in atmosphere A2. Sensor element 46 includes a multi-stage bellows assembly 50 within a protective housing 52. The housing has passages 54 for free admission of fluid 18 into and surrounding the exterior of capsules 56 of the bellows assembly, and therefore are submitted to the fluid atmosphere A2 at the bottom of the tank.

The transducer section 48 is at atmosphere A1 supplied via vent tube 40, and is sealed from the fluid atmosphere A2. The transducer section includes a base plate 66, side support 72 and top plate 74 all sealed to each other. Housing 72 top plate 74 has passages 76, 78 for receipt of vent tube 40 and cable 20, as sealed by potting compound, respectively. The bellows assembly 50 is mounted on a flange plate 68 which is sealingly engaged by means of 0-ring 70 at the bottom of base plate 66. A hollow support structure 60 supports the bellows assembly 50 and extends down from flange plate 68, and the interior of structure 60 is in atmospheric communication with the interior of transducer section 48 via corresponding openings in plates 66, 68, respectively, and with the interiors of capsules 56, at the pressure of atmosphere A1, and seal 62 isolates this from the fluid environment (A2).

Capsules 56 are serially coupled by means of shaft 58 to which they are mounted, the shaft extending within chambered support 60 and into transducer section 48 through plates 66, 68. Transducer section 48 includes an electrical pickup transducer 88, having a central annulus 64 through which extends a core 90 mounted at the end of a coupler 59 on shaft 58, and therefore the displacement of shaft 58 causes displacement of core 90 within transducer 88, for generating a detection signal reflective of displacement of the pressure-sensitive capsules.

Bellows assembly 50 preferably comprises three thin, disk-shaped capsules 56, each of which are held extended by an internal spring action and which expand and contract with changes in the pressure difference between atmospheres A1 and A2. The capsules are fabricated from NiSpanC and the support 60, spacers 61, and plates 66, 68 are made of INVAR, for minimal and known thermal expansion. Plunger 58 and coupler 59 are also made of INVAR. These components are then selected so that the amount of thermal expansion of the transducer 88, plates 66, 68, support 60, spacers 61 and capsules 56 is equal to the amount of thermal expansion of plunger 58, coupler 59 and core 90. While typical capsules 56 are each partially evacuated and sealed, in the present invention the capsules are internally coupled so that they all are submitted to the same internal atmosphere A1 on the same side of the bellows assembly as its attachment to plate 68. Such mounting and attachment facilitates the thermal balancing just described, and the comparison of the selected atmospheres (A1 and A2) eliminates exogenous errors.

In operation, if the mass of stored fluid is reduced, less pressure will be exerted at the bottom of the tank, and this will be sensed as a change in the difference between the vapor pressure of atmosphere A1 and that of the bottom fluid atmosphere A2. This change is then communicated to the transducer 88 via displacement of shaft 58 and core 90 and generates an output signal representative of this sensed change. This output data is then converted, by electronics package 24 into fluid quantity and loss rate information, which can be displayed on computer 26 or used by a tank environment controller. The conversion is based upon known characteristics of the storage tank of interest and in view of physical properties of the fluid, such as specific gravity at standard temperature ($p_0$), thermal expansion coefficient of the stored fluid ($\epsilon$), and the local acceleration due to gravity (g).

In a preferred embodiment of the invention, transducer 88 is an AC operated LVDT. The LVDT is a mutual inductance element. It produces an electrical output proportional to the displacement of core 90. The transformer includes a primary coil winding 92 and two identical secondaries 94, 96, symmetrically spaced from the primary. The secondaries are connected externally in series opposition in a synchronous demodulation circuit within package 24 for retrieving phase information from the detector indicative of bellows displacement and correlated to differentiated pressure, which in turn is correlated with volume.

As core 90 is displaced the mutual inductance of each secondary is varied relative to the primary, which determines the voltage induced from the primary to each secondary. Coils 92, 94, 96 are accordingly appropriately coupled to driver electronics in package 24. Because there is no physical contact between the core and the coil, mechanical components of the LVDT do not wear out or deteriorate, and this renders the LVDT a reliable device for use in a hazardous environment. Advantageously, the corresponding absence of friction gives essentially infinite resolution and little or no hysteresis. Furthermore, the small core mass and the lack of friction enhance response capabilities for dynamic measurements.

The transducer and bellows assembly may be assembled and calibrated at the factory. During system installation, in one embodiment, an output is derived from the sensor installed in the empty tank, indicative of zero fluid volume, and then the tank is filled to its maximum and the corresponding displacement of capsules 56 displaces core 90, accordingly inducing a differential output representative of such filled volume. The system calibration may include input from a tank environment controller or may proceed in an unaided self-calibration mode. The latter mode is implemented by monitoring addition or removal of known amounts of fluid from the tank, such as by means of one or more fixed-location height-measurement devices (e.g., optical devices $H_1$, $H_2$), which provide a known fluid height, and from which height information, $\rho$ and $\epsilon$ may be derived. The rate of change of the detection signal, or signals, provides fluid loss rate.

Figure 3:
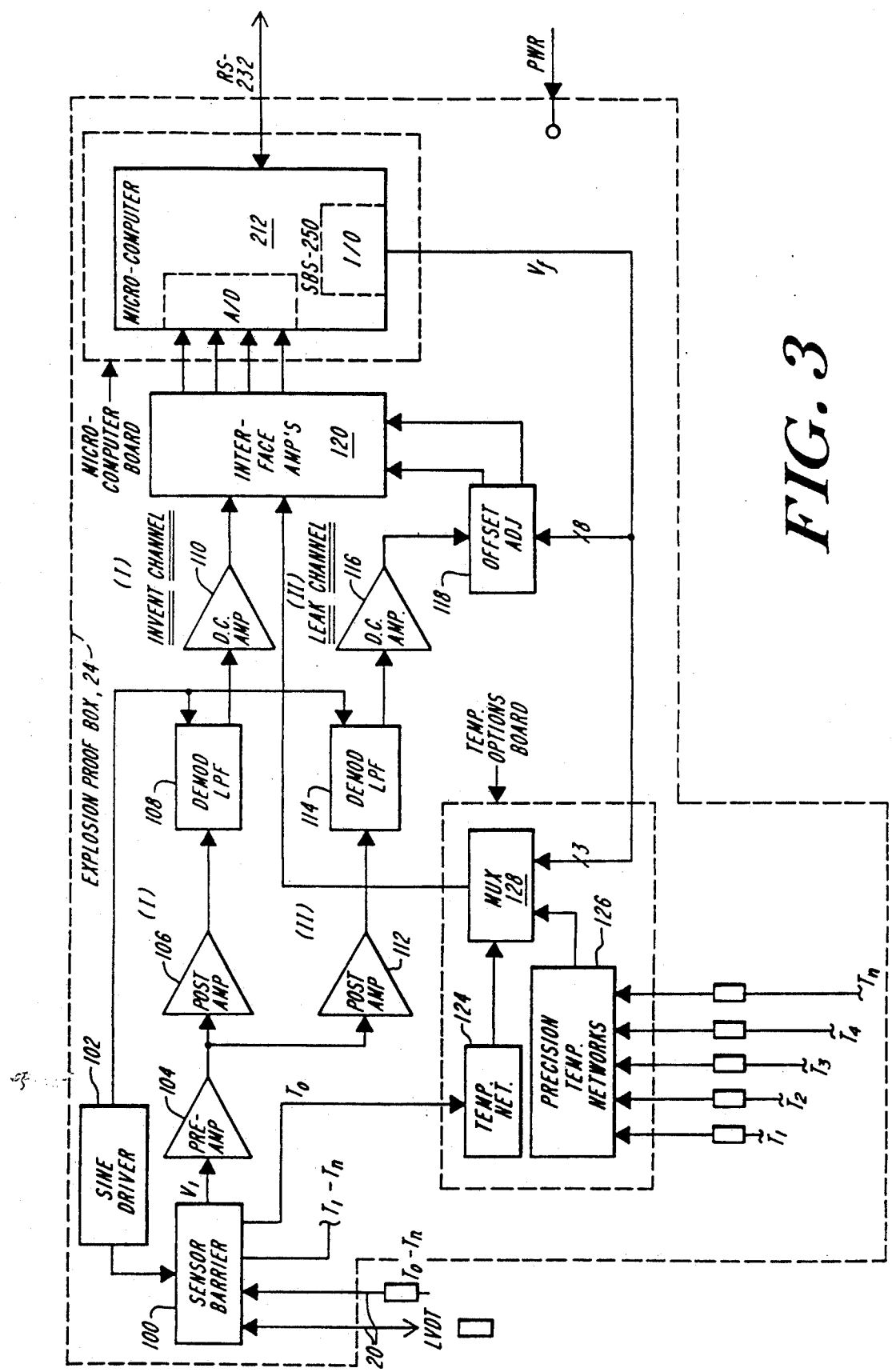
FIG. 3 is a block diagram of the electronic signal conditioning and process package of the invention.

The processing electronics package 24 is shown in detail in FIG. 3, in which sensor barrier circuit 100 applies an excitation voltage from sine drive circuit 102 to the LVDT primary coil 92, and a differential pressure signal representative of displacement of core 90 (driven by changes in the bellows assembly 50 and plunger 58) and derived from the two secondaries 94, 96 is inputted to sensor barrier circuit 100, all via cable 20. Also inputted to barrier 100 via cable 20 is temperature data from sensor $T_0$ (which is mounted at transducer 88). In a preferred embodiment, the system is further provided with temperature data from sensors $T_l$ to $T_n$ (mounted at various strata within the tank), for more accurate temperature correction. The barrier circuit is an intrinsically safe protection circuit that eliminates any possibility of causing an ignition situation in the hostile environment.

After pre-amp 104, the barrier circuit output $V_1$ is split between a low-gain inventory signal demodulator channel (I), including post-amp 106, synchronous demodulator/low pass filter 108 and DC amplifier 110, and a high-gain leak detection demodulator channel (II), including post-amp 112, synchronous demodulator/low pass filter 114 and DC amplifier 116, and offset adjust circuit 118. The output of each channel is an LVDT displacement-versus-output voltage, having a sensitivity of 0.036 inches/volt or 240 microinches/volt for inventory or leak detection, respectively.

The outputs of the inventory and leak channels are applied via interfacing amplifier circuits 120 to the A/D inputs of microprocessor 122. The microprocessor outputs a feedback signal $V_f$ to the offset adjust circuit 118 which ranges the higher-sensitivity output of the leak channel (II) to a useable level before application to amplifiers 120. The inventory channel has a slow integration-type response while the leak channel has a fast response. The latter is used to make a decision as to whether the offset level must be updated.

Since the density of the fluid being measured is known, then the pressure signal outputted by either channel I or II can be processed by the microcomputer 122 to determine the inventory quantity or loss rate. However, the density must be adjusted for thermal effects. Therefore thermal data from inputs $T_0$ to $T_n$ via networks 124, 126 and multiplexer 128 is applied via interface 120 to the microcomputer. It is noted that the temperature data $T_0$ enables compensation for thermal effects directly at the sensor 12, while thermal data from inputs $T_l$ to $T_n$ enables independent compensation for thermal gradients within the tank.

In the low resolution mode, channel I, the sensor signal representing the bellows displacement is compensated for the transducer (LVDT) non-linearity, for the effect of its installation at but slightly above the actual bottom of the tank and for temperature drift, to obtain an adjusted displacement value. This value is adjusted for the non-linearity and spring constant of the bellows to obtain a pressure value. The latter is then adjusted for the density of the measured fluid (and the density itself is adjusted for the temperature of the fluid, for gravity effects, and for the thermal expansion coefficient of the fluid), to obtain a column height value, and this is converted in a strapping table (a cross-reference between vertical height of the fluid and volume according to characteristics of the tank in which the system is installed) into gross quantity in gallons at current temperature. The column height value can also be normalized to the industry standard of 60° F. by use of an appropriate density value, in which event an adjusted column height value will be applied to the strapping table and the output will be in net gallons. Alternatively, the gross volume may be corrected by using the same normalization factors to directly yield net gallons, in which event use of the strapping table would be minimized. The final readout is preferably based upon several iterations, such as where temperature data for strata of the fluid is available.

Figure 4:
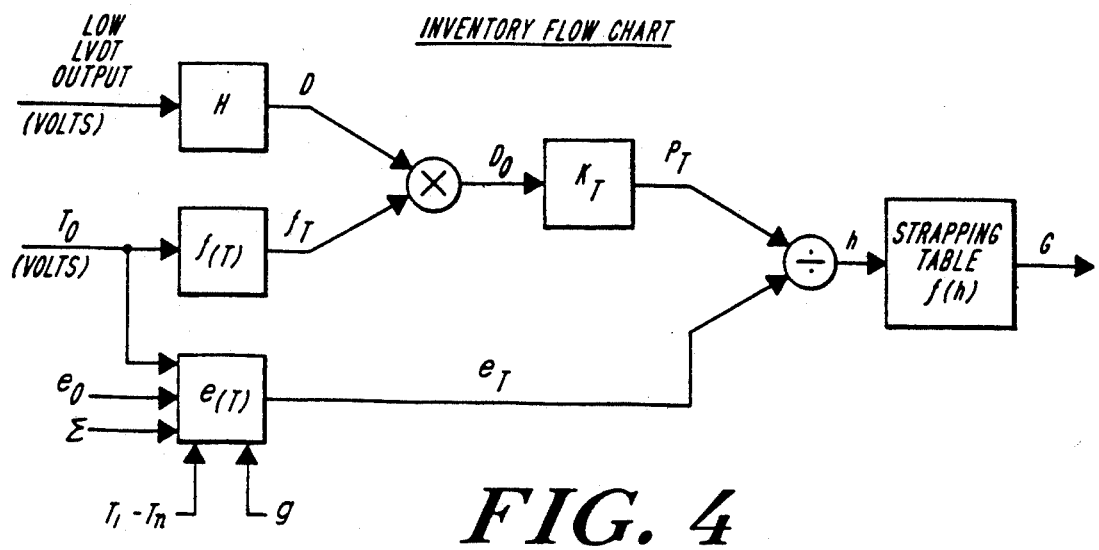
FIG. 4 is a flow chart of the inventory control process of the invention.

The inventory signal processing routine employed by the microprocessor is shown in FIG. 4, where the displacement signal D from the LVDT, adjusted for the LVDT transfer function H, and the temperature data $f_T$, adjusted for the LVDT temperature function f(T), produce the product $D_0$ as a distance datum (which represents the displacement of the bellows), and, adjusted for the bellows transfer function $K_t$, obtains a pressure value $P_T$, which in turn is adjusted by a determined density value $\rho_T$, determined by the function $\rho(T)$, to obtain the height h of the measured fluid. This value is converted by a strapping table to obtain gallons as a function $f_h$ of height (which reflects the particular geometric volume dependency on the height of the fluid in the tank) to obtain an output representative of the gallons G in the tank. This output is applied to computer 26 for display of the volume of fluid in the tank.

In the high resolution mode the sensor signal representing the bellows displacement is autoranged at expanded gain to an operative level and is compensated for transducer non-linearity, for the effect of its installation at but slightly above the actual bottom of the tank, and for temperature drift, to obtain a modified adjusted displacement value. This value is then adjusted for the non-linearity and spring constant of the bellows to obtain a modified pressure value. The latter is then adjusted for the net density of the measured fluid to obtain a modified column height value, and this is converted in a strapping table to quantity in gallons. A sequence of these readings is taken over a period of time, or at least one other reading is taken after a period of time, to determine leak rate in gallons per hour.

Figure 5:
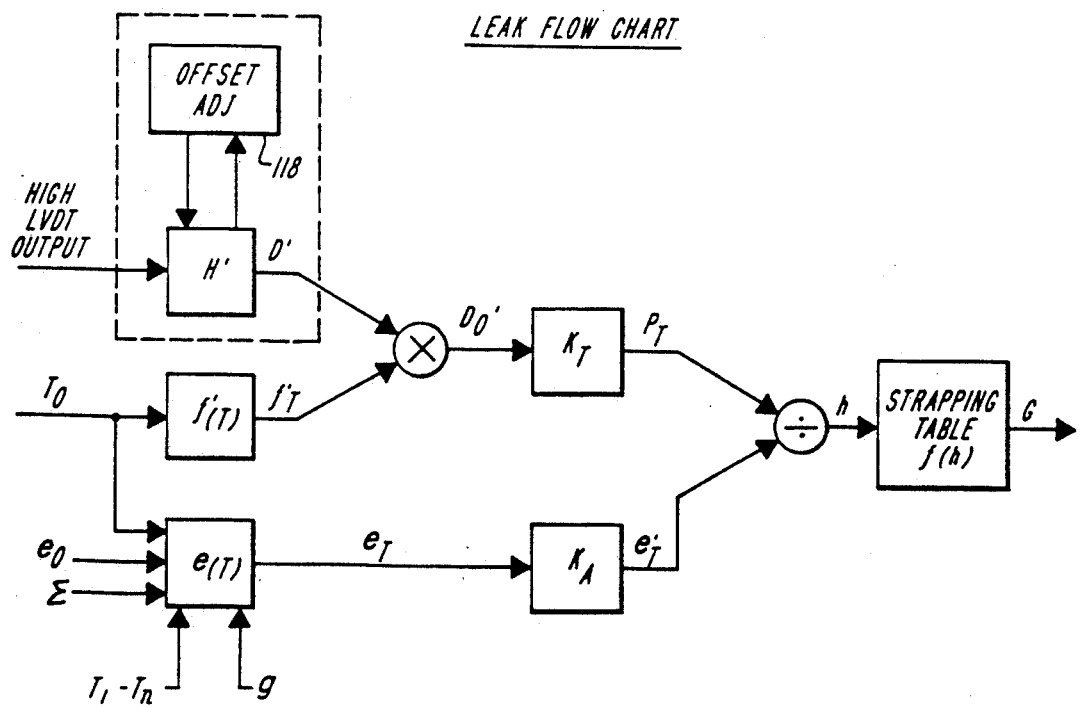
FIG. 5 is a flow chart of the leak detection process of the invention.

The leak detection scheme employed by the microprocessor is shown in FIG. 5, where the offset data signal D' from the LVDT, adjusted for the LVDT transfer function H', and the temperature data $f_T$, adjusted for the LVDT temperature function f(T), produce the product $D_0'$ as a distance datum (which represents the displacement of the bellows with greater accuracy), and, adjusted for the bellows transfer function $K_t$, obtains pressure value $P_T$, which in turn is adjusted by a determined density value $\rho_T'$, derived from $\rho_T$ adjusted for by $K_A$ (which is a high sensitivity correction necessary for the fluid density as a function of temperature), to obtain the height h of the measured fluid. This value is again converted to obtain an output representative of the gallons G in the tank. This output is then compared to a series of like readings over a period, or to a second reading at the end of a period, to obtain a loss rate in gallons per hour, which is used at computer 26 accordingly.

The $\rho_T$ and $\rho_T'$ functions also are corrected for deviation in the local acceleration of gravity g, thermistor inputs $T_1$-$T_n$, the thermal coefficient of expansion for the stored fluid $\epsilon$, and the density of the fluid at 60° F. $\rho_0$, and also possibly for $T_0$ if used as part of the strata temperature data.

The leak measurement system is quite sensitive, and therefore such measurements should not be made within an hour after the fluid has been pumped, battered or moved. In an alternative embodiment of the invention, the low pass filters may be replaced by digital signal processing within the microprocessor, so as to overcome excessively noisy environments in which vehicle passage, filling and dispensing turbulence or other disturbances must be canceled.

Other embodiments of this invention which will occur to those skilled in the art are within the scope of the following claims.

What is claimed is:

1. A system for monitoring fluid quantity in a storage tank, comprising
    (a) a detection device for location at a bottom of the tank and in contact with the fluid, the device including
        a bellows unit immersed in the fluid, and
        a displacement sensor for detecting displacement of the bellows and for issuing an output signal representative of the detected bellows displacement, and
    (b) a processor unit for monitoring said sensor output signal and for correlating such output signal with changes in the mass of the fluid, for determining fluid quantity and loss rate of the stored fluid.

2. The system of claim 1 wherein the sensor is electromechanical.

3. The system of claim 2 wherein the sensor is characterized as having low hysteresis and high stability.

4. The system of claim 1 wherein the sensor is a linear variable differential transformer (LVDT) mounted in physical communication with and in the same atmosphere as the interior of said bellows unit.

5. The system of claim 1 wherein the sensor is mounted in physical communication with and in the same atmosphere as the interior of said bellows unit, the sensor and bellows interior being mounted outside of the fluid and in communication with any vapor pressure at the top of the fluid.

6. The system of claim 5 wherein the bellows unit includes at least three capsules which are mechanically coupled together, the interiors of said capsules being in the same atmosphere.

7. The system of claim 6 wherein said sensor comprises a moveable core, said sensor being mounted on a bottom plate, further comprising a plunger and coupler, said capsules mounted concentrically on said plunger, said plunger coupled to said core via said coupler, said capsules mounted together spaced by spacers on said plunger as a capsule assembly, and on one side of one of said capsules said capsule assembly is mounted on a support which extends to a flange plate sealingly mounted to the bottom of said bottom plate, said plunger coupled to said core extending through said capsules, column, flange plate, and bottom plate and into said sensor,
    the amount of thermal expansion of said sensor, plates, support, spacers and capsules being essentially equal to the amount of thermal expansion of said plunger, coupler and core.

8. The system of claim 1 wherein the sensor is a linear variable differential transformer (LVDT) mounted in physical communication with and in the same atmosphere as the interior of said bellows unit, the sensor and bellows interior being mounted outside of the fluid and in communication with any vapor pressure at the top of the fluid, further comprising
    means for compensating said sensor signal for LVDT non-linearity, for any amount that the sensor is installed above the actual bottom of the tank, and for temperature drift of the sensor, to obtain an adjusted displacement value,
    means for adjusting said displacement value for the non-linearity and spring constant of the bellows unit, to obtain a pressure value, means for adjusting said pressure value for the density of the measured fluid, where the density itself is adjusted for the temperature of the fluid, for gravity effects, and for the thermal expansion coefficient of the fluid, to obtain a column height value, and means for converting said column height value into a volumetric quantity.

9. The system of claim 8 wherein said volumetric quantity is gross gallons at current temperature.

10. The system of claim 8 wherein said means for converting said column height value comprises a strapping table for cross-reference between said column height value and volume according to characteristics of the tank in which the system is installed.

11. The system of claim 8 further comprising means for normalizing said volumetric quantity to net gallons at 60° F.

12. The system of claim 1 further including means for monitoring addition or removal of known amounts of fluid from the tank, said means including a fixed-location height-measurement device for determining fluid height.

13. A method for determining storage tank fluid inventory quantity in a system comprising a detection device for location at a bottom of the tank and in contact with the fluid, the device including a bellows unit immersed in the fluid, and a displacement sensor for detecting displacement of the bellows and for issuing an output signal representative of the detected bellows displacement, and a processor unit for monitoring said sensor output signal and for correlating such output signal with changes in the mass of the fluid, for determining quantity of the stored fluid, the method comprising the steps of multiplying (1) a displacement signal D from said sensor, said displacement signal being adjusted according to a transfer function H for said sensor, and (2) a signal representative of the sensor temperature, the sensor temperature signal being adjusted according to a temperature function of the sensor, to obtain an adjusted displacement signal representing the amount of displacement of said bellows unit, said displacement signal being adjusted for a transfer function of said bellows unit, resulting in obtaining a pressure signal, said pressure signal being adjusted by a determined density value to obtain a height signal representative of the height of the measured fluid, and comparing said height signal to known stored values to obtain a geometric volume-dependent signal representing the number of gallons in the tank.

14. The method of claim 13 further comprising a series of thermistors located within various strata of the tank, further comprising the steps of correcting the pressure value signal according to (1) deviation in the local acceleration of gravity,
(2) temperature data signals from said thermistors,
(3) the thermal coefficient of expansion for the stored fluid, and
(4) the density of the fluid of 60° F.

15. A method for determining storage tank fluid inventory quantity in a system comprising a detection device for location at a bottom of the tank and in contact with the fluid, the device including a bellows unit immersed in the fluid, and a displacement sensor for detecting displacement of the bellows and for issuing an output signal representative of the detected bellows displacement, and a processor unit for monitoring said sensor output signal and for correlating such output signal with changes in the mass of the fluid, for determining fluid quantity and loss rate of the stored fluid, the method comprising the steps of obtaining a sensor displacement signal which is adjusted with a transfer function signal, resulting in a displacement signal representing displacement of the bellows unit, said displacement signal being adjusted with a bellows unit transfer function, said adjusting resulting in a pressure value signal, said pressure value signal being adjusted with a determined density value signal, said density value signal being adjusted with a high resolution transfer function to obtain a height signal representative of the height of the measured fluid, and said height signal being converted to a signal representative of gallons as a function of height reflecting the particular geometric volume dependency on the height of the fluid in the tank, and a series of said gallon signals being obtained and then compared to obtain a loss rate in gallons per hour.

16. The method of claim 15 further comprising a series of thermistors located within various strata of the tank, further comprising the steps of correcting the pressure value signal (1) for deviation in the local acceleration of gravity, (2) for temperature signal thermistor inputs T1-Tn, (3) for the thermal coefficient of expansion for the stored fluid, and (4) for the density of the fluid at 60° F.

* * * * *